(12) United States Patent
Logue

(10) Patent No.: US 9,948,622 B2
(45) Date of Patent: Apr. 17, 2018

(54) AUTHENTICATED SESSION ESTABLISHMENT

(71) Applicant: Google Inc., Mountain View, CA (US)

(72) Inventor: Jay D. Logue, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/356,121

(22) Filed: Nov. 18, 2016

(65) Prior Publication Data

US 2017/0070491 A1 Mar. 9, 2017

Related U.S. Application Data

(63) Continuation of application No. 14/613,141, filed on Feb. 3, 2015, now Pat. No. 9,462,624, which is a
(Continued)

(51) Int. Cl.
*H04W 4/00* (2018.01)
*H04L 29/06* (2006.01)
(Continued)

(52) U.S. Cl.
CPC .............. *H04L 63/061* (2013.01); *G06F 8/65* (2013.01); *H04L 9/0861* (2013.01); *H04L 9/14* (2013.01); *H04L 9/30* (2013.01); *H04L 9/32* (2013.01); *H04L 9/3247* (2013.01); *H04L 9/3263* (2013.01); *H04L 9/3265* (2013.01); *H04L 45/00* (2013.01); *H04L 45/74* (2013.01); *H04L 61/6059* (2013.01); *H04L 63/083* (2013.01); *H04L 67/10* (2013.01); *H04L 67/12* (2013.01); *H04L 67/34* (2013.01); *H04L 69/165* (2013.01); *H04L 69/22* (2013.01); *H04W 12/04* (2013.01); *H04W 12/06* (2013.01); *H04W 24/04* (2013.01); *H04W 24/10* (2013.01); *H04W 52/0212* (2013.01); *H04W 52/383* (2013.01); *H04W 60/00* (2013.01); *H04W 72/0493* (2013.01);
(Continued)

(58) Field of Classification Search
USPC ........................................... 370/252
See application file for complete search history.

(56) References Cited

U.S. PATENT DOCUMENTS 6,819,652 B1  11/2004  Akhtar et al.
7,051,206 B1   5/2006  Giest et al.
(Continued)

OTHER PUBLICATIONS

"Final Office Action", U.S. Appl. No. 14/613,141, dated Nov. 6, 2015, 6 pages.
(Continued)

*Primary Examiner* — Farah Faroul
(74) *Attorney, Agent, or Firm* — Colby Nipper

(57) ABSTRACT

Methods, devices, and machine-readable media are provided to provide secure communications between entities. As provided in this disclosure, this may include receiving a request to begin a new communication session, determining one or more desired parameters of the session, and determining whether the desired parameters of the message match proposed parameters provided by the entity requesting the new communication session. When the one or more proposed parameters match the one or more desired parameters, a secure communication session is established between the entities, using shared password information.

20 Claims, 12 Drawing Sheets

Related U.S. Application Data continuation of application No. 14/508,933, filed on Oct. 7, 2014, now Pat. No. 9,503,448.

(51) Int. Cl.

| | | |
|---|---|---|
| *H04W 52/02* | (2009.01) | |
| *H04W 76/02* | (2009.01) | |
| *H04W 24/04* | (2009.01) | |
| *H04L 29/08* | (2006.01) | |
| *H04L 12/701* | (2013.01) | |
| *H04W 88/02* | (2009.01) | |
| *H04L 29/12* | (2006.01) | |
| *H04W 72/04* | (2009.01) | |
| *H04W 24/10* | (2009.01) | |
| *H04W 84/12* | (2009.01) | |
| *H04L 9/08* | (2006.01) | |
| *H04L 9/32* | (2006.01) | |
| *H04L 12/741* | (2013.01) | |
| *G06F 9/445* | (2018.01) | |
| *H04W 52/38* | (2009.01) | |
| *H04W 60/00* | (2009.01) | |
| *H04L 9/14* | (2006.01) | |
| *H04L 9/30* | (2006.01) | |
| *H04W 12/04* | (2009.01) | |
| *H04W 12/06* | (2009.01) | |
| *H04W 84/18* | (2009.01) | |
| *H04W 88/04* | (2009.01) | |
| *H04W 88/06* | (2009.01) | |
| *H04W 80/04* | (2009.01) | |
| *H04L 12/58* | (2006.01) | |

(52) U.S. Cl.
CPC ......... *H04W 76/02* (2013.01); *H04W 76/023* (2013.01); *H04W 84/12* (2013.01); *H04W 88/02* (2013.01); *H04L 51/00* (2013.01); *H04L 61/2038* (2013.01); *H04L 61/6004* (2013.01); *H04L 63/0823* (2013.01); *H04W 80/045* (2013.01); *H04W 84/18* (2013.01); *H04W 88/04* (2013.01); *H04W 88/06* (2013.01); *Y02B 60/50* (2013.01)

(56) References Cited

U.S. PATENT DOCUMENTS

| | | | | |
|---|---|---|---|---|
| 7,194,620 | B1 | 3/2007 | Hayes | |
| 8,027,921 | B1* | 9/2011 | Boydstun | G06F 21/31 705/50 |
| 8,352,725 | B1 | 1/2013 | O'Toole, Jr. | |
| 9,054,863 | B2* | 6/2015 | Sin | H04L 9/0891 |
| 9,462,624 | B2 | 10/2016 | Logue | |
| 9,503,448 | B2 | 11/2016 | Logue | |
| 9,515,825 | B2* | 12/2016 | Yoon | H04L 9/0844 |
| 2003/0056096 | A1* | 3/2003 | Albert | G06F 21/31 713/168 |
| 2005/0273607 | A1* | 12/2005 | Yamana | G06F 21/31 713/168 |
| 2006/0155997 | A1* | 7/2006 | Fritzges | H04L 63/0428 713/171 |
| 2006/0190410 | A1 | 8/2006 | Harper | |
| 2007/0204330 | A1* | 8/2007 | Townsley | H04L 9/3271 726/4 |
| 2007/0280482 | A1 | 12/2007 | Yan et al. | |
| 2008/0260143 | A1 | 10/2008 | Ibrahim | |
| 2008/0298582 | A1 | 12/2008 | Sakai | |
| 2010/0262828 | A1* | 10/2010 | Brown | H04L 9/0844 713/171 |
| 2013/0110920 | A1 | 5/2013 | Broustis et al. | |
| 2013/0111196 | A1 | 5/2013 | Pasam et al. | |
| 2013/0160086 | A1 | 6/2013 | Katar et al. | |
| 2013/0170350 | A1 | 7/2013 | Sarkar et al. | |
| 2013/0276064 | A1* | 10/2013 | Ignatchenko | H04L 63/04 726/3 |
| 2015/0149781 | A1 | 5/2015 | Logue | |
| 2016/0099934 | A1 | 4/2016 | Logue | |

OTHER PUBLICATIONS

"First Action Interview Office Action", U.S. Appl. No. 14/613,141, dated Jul. 10, 2015, 10 pages.

"Non-Final Office Action", U.S. Appl. No. 14/508,933, dated Feb. 10, 2016, 16 pages.

"Notice of Allowance", U.S. Appl. No. 14/508,933, dated Jul. 27, 2016, 7 pages.

"Notice of Allowance", U.S. Appl. No. 14/613,141, dated Feb. 23, 2016, 8 pages.

"Notice of Allowance", U.S. Appl. No. 14/613,141, dated May 20, 2016, 5 pages.

"Pre-interview First Office Action", U.S. Appl. No. 14/613,141, dated Apr. 17, 2015, 4 pages.

Eliptic Curce Digital Signature Algorithm, Wikipedia, Sep. 17, 2014, Wikimedia Foundation.

Diffie-Hellman key exchange, Wikipedia, accessed Oct. 1, 2014.

Transport Layer Security, Wikipedia, Jul. 10, 2014, Wikimedia Foundation.

Key derivation function, Wikipedia, Jul. 10, 2014, Wikimedia Foundation.

\* cited by examiner

AUTHENTICATED SESSION ESTABLISHMENT

CROSS REFERENCE TO RELATED APPLICATIONS

This application is a Continuation Application of, and claims priority to, U.S. patent application Ser. No. 14/508,933, entitled "Authenticated Session Establishment", filed Oct. 7, 2014, and to U.S. patent application Ser. No. 613,141, entitled "Authenticated Session Establishment", filed Feb. 3, 2015 the entirety of which are incorporated by reference herein for all purposes.

BACKGROUND OF THE DISCLOSURE

This disclosure relates to systems, devices, methods, and related computer program products for smart buildings including the smart home. More particularly, this patent specification relates to establishing communications between two nodes of smart networks.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices are now capable of connecting to local as well as wide area networks. As the number of electronic devices on these networks increase, the amount of sensitive data and/or sensitive interactions between these electronic devices and data on the networks may increase. As such, increased security may be desired regarding communications to/from the electronic devices.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for establishing secure communications to and/or from devices on a smart mesh network. The embodiments include establishing an encrypted communication session using an encryption key derived from a session request using a public key and private key combination.

When a request to begin a session is received by a responder within the network, the request is validated by the responder. Once validated, a response is provided that enables the initiator to derive an encryption key for subsequent communications between the initiator and the responder.

In some embodiments, the request and/or response may include a proposal of particular encryption algorithms and/or elliptical curves to use in the encryption. To prevent downgrade attacks (e.g., a "man in the middle" who persuades the initiator and/or responder to downgrade a proposed protocol or protocol configuration (e.g., defining a key size, key generation algorithm, etc.)), the session request message may include a proposed protocol/protocol configuration, a list of usable protocols/protocol configurations of the initiator, a proposed elliptic curve, and alternative elliptic curves that may be used by the initiator. The responder may confirm that a prioritized protocol and elliptic curve are used, based upon the list of available protocols and curves. Accordingly, if a "man in the middle" attempts to downgrade to a simpler protocol or elliptic curve, the responder may deny the connection, instead requesting a reconfiguration using the best common protocol and/or common elliptic curve between the initiator and the responder.

BRIEF DESCRIPTION OF THE DRAWINGS

Various aspects of this disclosure may be better understood upon reading the following detailed description and upon reference to the drawings in which.

DETAILED DESCRIPTION OF THE DISCLOSURE

Figure 1:
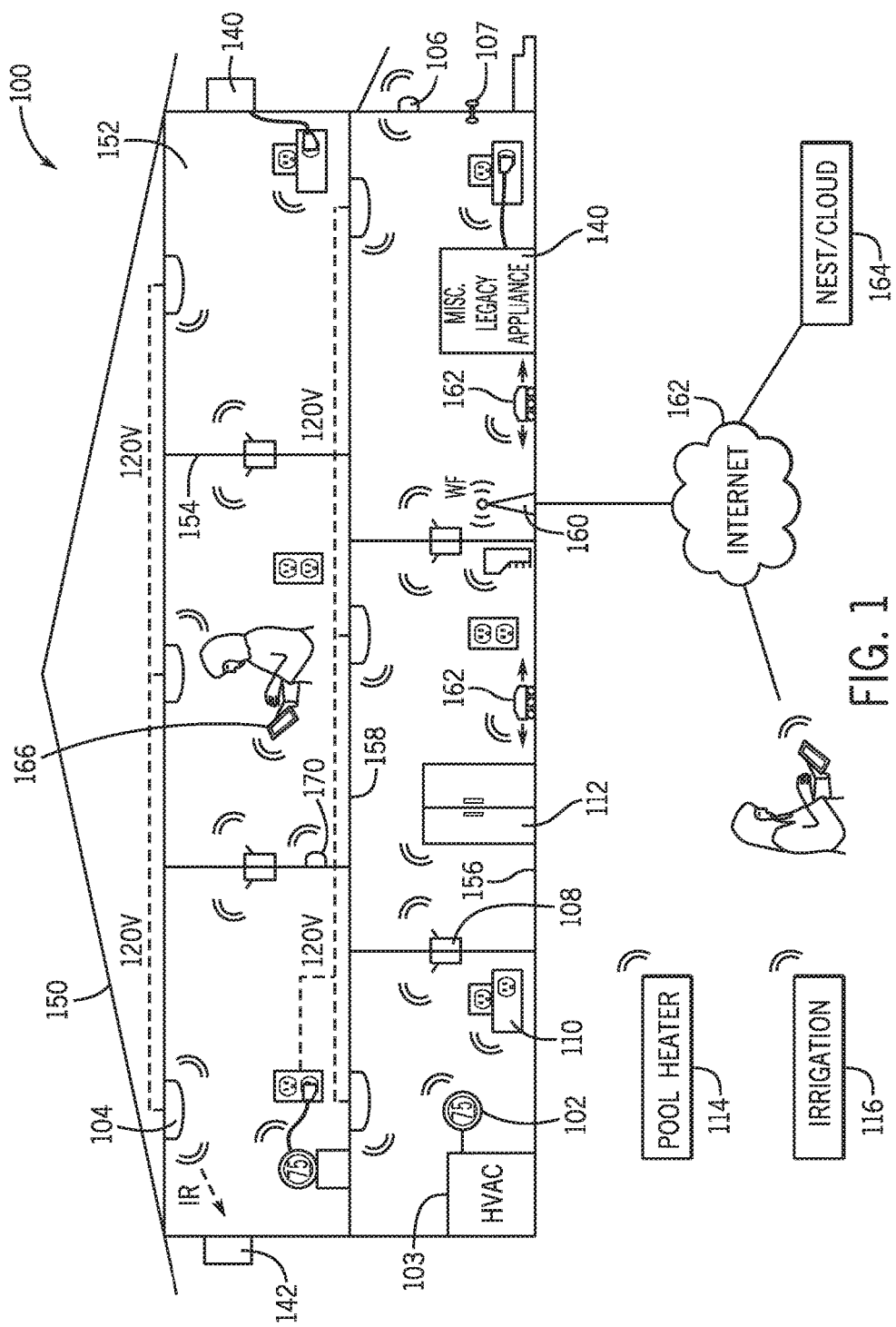
FIG. 1 is a schematic illustration of a smart-home environment within which one or more of the devices, methods, systems, services, and/or computer program products described herein may be used, according to an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It should be appreciated that "smart home environments" may refer to smart environments or smart networks for any building type, such as single-family houses, duplexes, townhomes, multi-unit apartment buildings, hotels, retail stores, office buildings, industrial buildings, and any building that may include one or more smart devices.

It is to be further appreciated that while the terms user, customer, installer, homeowner, occupant, guest, tenant, landlord, repair person, user, and similar terms may be used to refer to a person or persons interacting with a smart device within the network via a user interface, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the units, and is also one of the users of the units. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the embodiments—for example, the password-protected network commissioning functionality described herein may be particularly advantageous where the landlord holds the sole password and can control network additions—such identity should not be construed in the descriptions that follow as necessarily limiting the scope of the present teachings to those particular individuals having those particular identities.

Smart Network

With the foregoing in mind, FIG. 1 illustrates an example of a smart-home environment 100, also referred to as a smart network, within which one or more of the devices, methods, systems, services, and/or computer program products described further herein can be applicable. The depicted smart-home environment 100 includes a structure 150, which can include, e.g., a house, office building, garage, or mobile home. In some embodiments, the devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes multiple rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes various devices, including intelligent, multi-sensing, network-connected devices that may integrate seamlessly with each other, with a central server, with a cloud-computing system, or some combination of these to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected doorbell devices 106 (hereinafter referred to as "smart doorbells 106"), and one or more intelligent, network-connected door locks 107 (hereinafter referred to as "smart door locks 107"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come). The smart door locks 107 may detect and toggle between a locked and unlocked condition for doors in the home, detect a person's approach to or departure from a respective door, detect whether a door is open or closed, or other suitable controls associated with a smart door lock.

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Further, in some embodiments, the smart-home environment 100 of FIG. 1 includes multiple intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, window sensors, security systems, and so forth. According to embodiments, the network-connected appliances 112 may be made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart door lock 107, the smart wall switches 108, the smart wall plugs 110, and other devices of the smart-home environment 100 may be modular and may be incorporated into older and new houses. For example, in some embodiments, the devices are designed around a modular platform consisting of two basic components: a head unit and a back plate, also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There are also many different versions for the head units, such as low-cost versions with few features, and then a progression of increasingly-capable versions, up to and including sophisticated head units with a large number of features. Thus, it should be appreciated that the various versions of the head units may be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room," "kitchen," and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information then may be used to obtain data helpful for determining optimal times for watering. Such data may include sun location information, temperature, dew point, soil type of the land on which the home is located, etc.

By virtue of network connectivity, one or more of the smart-home devices of FIG. 1 can also enable a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some embodiments, the device 166 may be connected to the smart network directly or through additional networks (e.g., WiFi) that are connected to the smart network using one or more devices (e.g., an edge router). In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. For example, a smart-home environment may receive communication from a mobile device of an individual who is known to be or who is registered as a guest or determined to be on a common network (e.g., SSID WiFi network) as the smart devices.

In some embodiments, in addition to containing processing and sensing capabilities, each of the devices 102, 104, 106, 107, 108, 110, 112, 114, 116, 162, 170 and other smart devices (collectively referred to as "the smart devices") may be capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For some embodiments, a user may be able to contact customer support using a device itself rather than needing to use other communication means such as a telephone or Internet-connected computer. Further, software updates can be automatically sent from the central server or cloud-computing system 164 to the smart devices (e.g., when available, when purchased, or at routine intervals).

As discussed below, the smart devices may be combined to create a mesh network. In some embodiments, this mesh network may include spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and may only communicate using wireless protocols that requires very little power, such as ZigBee, 6LoWPAN, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power listening-only nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to some embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 107, 108, 110, 112, and 170) may function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 107, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency or an emergency drill. In some instances, to facilitate this, users provide pre-configuration information that indicates exit routes in the smart-home environment 100. For example, for each room in the house, the user may provide a map of the best exit route depending on availability of the route. In some situations the route may be blocked by a hazard, and an alternate route may be illuminated and indicated, if available. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Also included and illustrated in the smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, ZigBee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of multiple known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated non-occupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of non-occupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gait, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
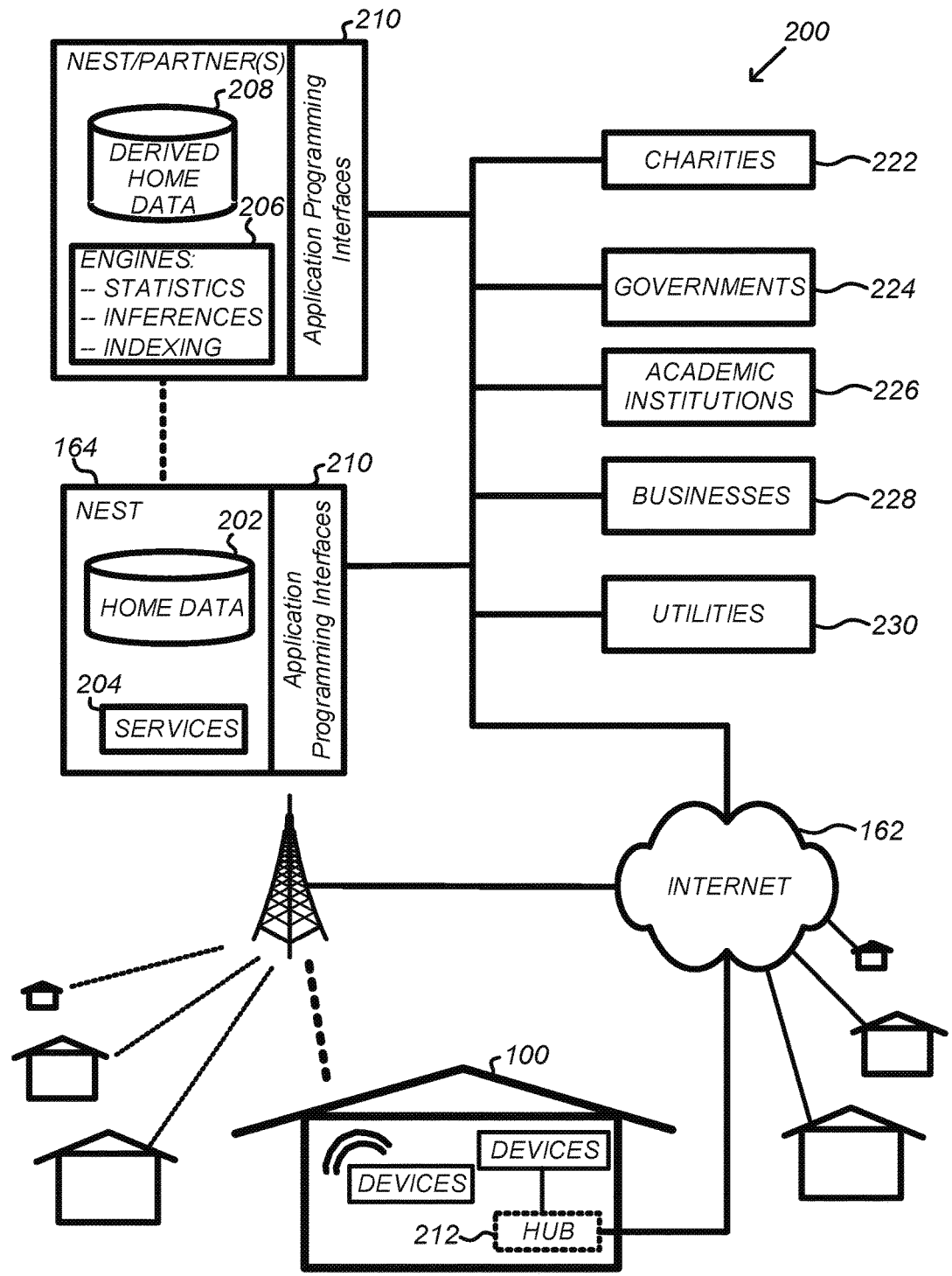
FIG. 2 is a network-level view of an extensible devices and services platform with which the smart-home environment of FIG. 1 can be integrated, according to an embodiment.

FIG. 2 illustrates a network-level view of an extensible devices and services platform 200 with which multiple smart-home environments, such as the smart-home environment 100 of FIG. 1, can be integrated. The extensible devices and services platform 200 includes remote servers or cloud computing architectures 164. Each of the smart devices can communicate with the remote servers or cloud computing architectures 164. For example, a connection to the Internet 162 can be established either directly (for example, using 3G/4G connectivity to a wireless carrier), through a wireless mesh network 212 (which can be a scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 may communicate with and collect data from multiple smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 may routinely collect data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. Additionally or alternatively, if a neighbor's hazard detector detect smoke, neighboring houses may activate irrigation systems to reduce likelihood of a spread of fire. It should be appreciated that this safety network can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 may be coupled to and permit third-party systems to communicate with the central server or the cloud-computing system 164, including the services 204, the processing engine 206, the home data 202, and the derived home data 208. For example, APIs 210 may allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
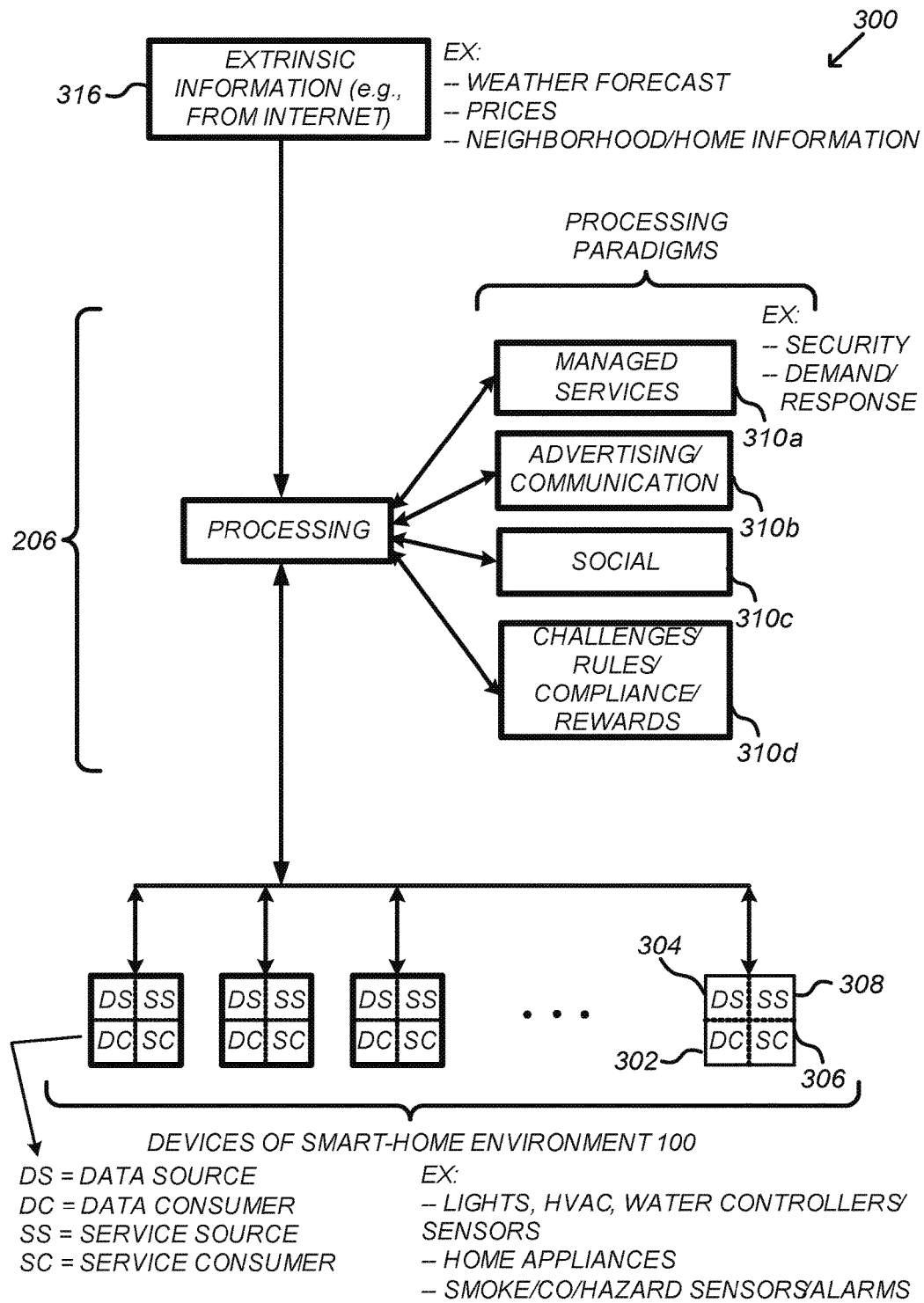
FIG. 3 is a functional view of the extensible devices and services platform of FIG. 2, with reference to a processing engine as well as devices of the smart-home environment, according to an embodiment.

FIG. 3 illustrates an abstracted functional view 300 of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Smart Network Topology

Figure 4:
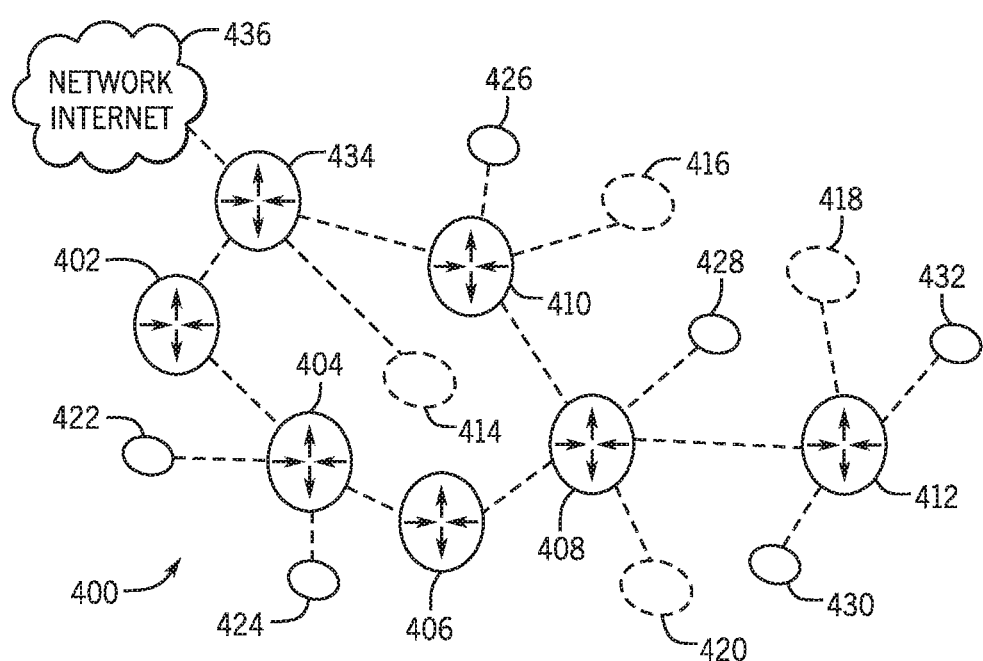
FIG. 4 is a block diagram view of a smart network connected to another network via an edge router, according to an embodiment.

FIG. 4 illustrates an example topology of a smart network 400 according to an embodiment. The smart network 400 includes routing devices 402, 404, 406, 408, 410, and 412, collectively referred to as routing devices 402-412. In some embodiments, the routing devices 402-412 may include any smart device capable of communicating with other devices in the network. Alternatively, the routing devices 402-412 may include only spokesman devices that have a reliable power source (e.g., AC power). For instance, the routing devices 402-412 may include smart thermostats 102, smart hazard detectors 104, smart outlets 110, or other smart devices that receive line power from the building 100. The routing devices 402-412 may include any capable of connecting to more than one other device—such as routing-capable devices 414, 416, 418, and 420 and end devices 422, 424, 426, 428, 430, and 432—to the network 400. The routing-capable devices 414, 416, 418, and 420 are devices (e.g., spokesman devices) that may be capable of routing connections to other devices but are currently only serving as an end device. The end devices 422, 424, 426, 428, 430, and 432 may be any smart device in the network 400. In some embodiments, the end devices 422, 424, 426, 428, 430, and 432 may be low power devices that do not have a reliable source of power. For example, the end device 422 may be a smart lock 107 that is battery powered. The smart network 400 may also include one or more edge routers 434 that connect the smart network 400 to one or more other (local or wide area) networks such as the Internet 436.

Although the illustrated embodiment includes 7 routers, some embodiments may include 1, 2, 3, 4, 5, or more routers. For example, an embodiment with a single router and multiple devices may be conceptualized as a hub and spoke or star network. However, when there are multiple routers, the smart network 400 may be more resistant to failure due to loss of connection to a single node. Furthermore, in a star network, the hub router may bottleneck communications through the network 400 since all communications pass through the single router. Moreover, a mesh network allows a physical extension of the network beyond a range of a single router's communication radius.

Communications in the Smart Network

Each of the example smart devices described above with respect to FIGS. 1-4 may be capable of data communications and information sharing with any other device, as well as to any cloud server or any other device that is network-connected anywhere in the world. In one embodiment, the smart devices may send and receive encrypted communications via the Certificate Authenticated Session Establishment (CASE) protocol that will be discussed below. In one embodiment, a responder to a request to begin a session may restrict communications when an initiator of the request to begin the session proposes an undesirable encryption protocol or elliptic encryption curve. Accordingly, downgrade attacks (e.g., attempts by third-parties to force downgrade to a weaker encryption protocol or elliptic curve) may be thwarted, as will be discussed in more detail with regard to FIG. 6. Further, one or more key derivation functions may strengthen the encrypted communications between the initiator and the responder.

Figure 5:
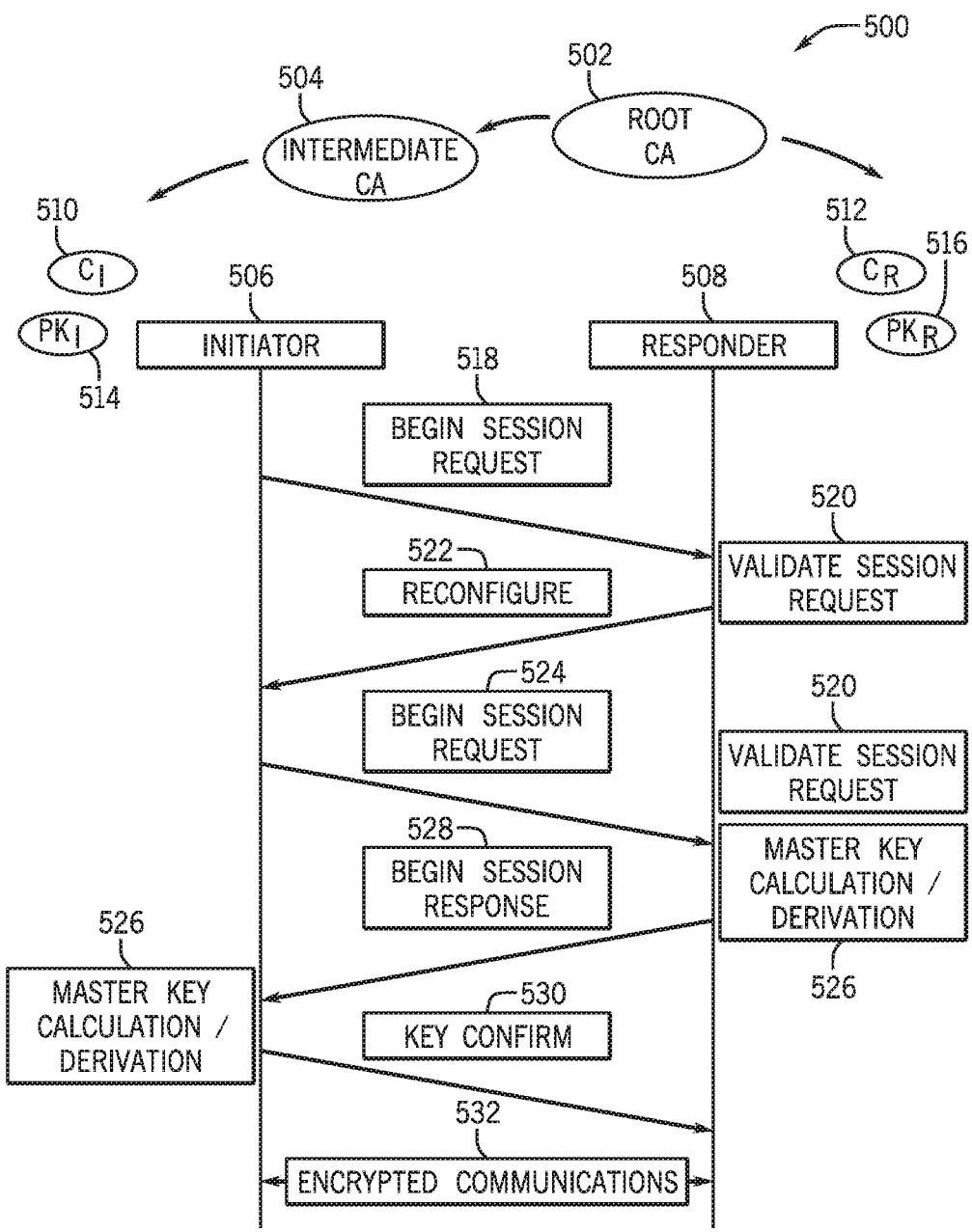
FIG. 5 is an illustration of a system that establishes a session using a certificate authenticated session establishment (CASE) protocol, in accordance with an embodiment.

FIG. 5 is a schematic diagram of a system 500 that communicates by creating a communications session using a certificate authenticated session establishment (CASE) protocol, in accordance with an embodiment. As may be appreciated, in systems that provide secured communications, one or more certificate authorities may provide digital certificates. For example, a root certificate authority 502 may provide one or more intermediate certificate authorities 504. Further, the root certificate authority 502 and/or intermediate certificate authorities 504 may provide one or more certificates to the communicating devices (e.g., the initiator 506 and/or the responder 508) of the system 500, as illustrated by the initiator certificate 510 and the responder certificate 512. As described herein, the initiator 506 is a device and/or system that requests the establishment of a new secure communications session. The responder 508 is a device and/or system that may grant or deny the establishment of the new secure communications session based at least in part upon parameters of the request provided by the initiator 506. Additionally, the initiator 506 and the responder 508 may generate and/or store private keys (e.g., initiator private key 514 and responder private key 516) that are restricted to local access (e.g., the initiator private key 514 is only known by the initiator 506 and the responder private key 516 is only known by the responder 508).

When provided by a trusted certificate authority, these digital certificates may certify the identity of the holder of the certificate as trustworthy. For example, a signature of the certificate (e.g., initiator certificate 510) may be used to verify that the identity and other data of the certificate have not been altered. Accordingly, when the certificate is provided by a certificate authority that is trusted by the recipient of the data communications (e.g., the responder 508), the recipient may verify the identity of the certificate holder and the certificate data.

As mentioned above, the initiator 506 may desire to communicate with the responder 508. Accordingly, the initiator 506 may provide a begin session request 518. The begin session request 518 may be used to: authentic the initiator 506 (e.g., via verification of the certificate 510, identify the initiator 506 (e.g., by provided network identification data representative of the initiator 506), provide information for the establishment of a common encryption key between the initiator 506 and the responder 508, and/or negotiate CASE protocol parameters in the event that the initiator 506 and the responder 508 implement variations/options of the CASE protocol. The data used to provide these functionalities (e.g., the data provided in the begin session request 518) will be discussed in more detail below with regard to FIG. 7.

The responder 508 may receive the begin session request 518 from the initiator 506 and validate the session request, as represented by process 520. As will be discussed in more detail below with regard to FIG. 8, the process 520 may verify that the best variations/options of the CASE protocol are used in the establishment of the secure communications session, may verify that the begin session request 508 is intended for the responder 508, may authenticate the initiator, and may verify the trust between the responder 508 and the certificate authority providing the initiator certificate 510 to the initiator 506.

As will be discussed in more detail below with regard to FIG. 9, when the responder 508 disagrees with the proposed variations/options of the CASE protocol provided by the initiator 506 in the begin session request 518, the responder 520 may send a reconfigure request 522 to the initiator, indicating acceptable variation/options of the CASE protocol that will result in an established session.

The initiator 506 may receive the reconfigure request 522 and, based upon the reconfigure request 522, may provide a new begin session request 524 that conforms to the acceptable variation/options of the CASE protocol dictated in the reconfigure request 522.

Once the new begin session request 524 is received by the responder 508, the validation process 520 is once again implemented. Upon validation, the secure communications session may be initiated by implementing a master key calculation and/or derivation process 526, as will be described in more detail with regard to FIG. 11. Further, responder 508 may send either a failure message when a new session is unable to be established (e.g., when the begin session request cannot be validated via the process 520) or a begin session response 528 that provides data useful for providing and/or decrypting encrypted communications. Accordingly, the master key calculation/derivation process 526 may be invoked by the initiator to obtain the relevant keys for decryption of messages from the responder 508.

In some embodiments, the initiator 506 and/or the responder 508 may request the other entity to provide a key confirmation. As will be discussed in more detail below, the key confirmation ensures that both the initiator 506 and the responder 508 are using the same master key for decryption of encrypted messages. This is done by providing, from the responder, a piece of data derived from the master key. This piece of data is verified by the initiator 506 as being derived from the master key. Further, a separate piece of data derived from the master key is provided from the initiator 506 to the responder 508 in a key confirm message 530. Upon receiving the key confirm message 530, the responder 508 verifies the data provided in the key confirm message 530 as being derived from the master key. Once the master key is confirmed by both the initiator 506 and the responder 508 or once the begin session response 528 is received and neither the initiator 506 or the responder 508 requests a key confirmation, the master key (or a derivation of the master key) may be used to interpret encrypted communications 532.

Figure 6:
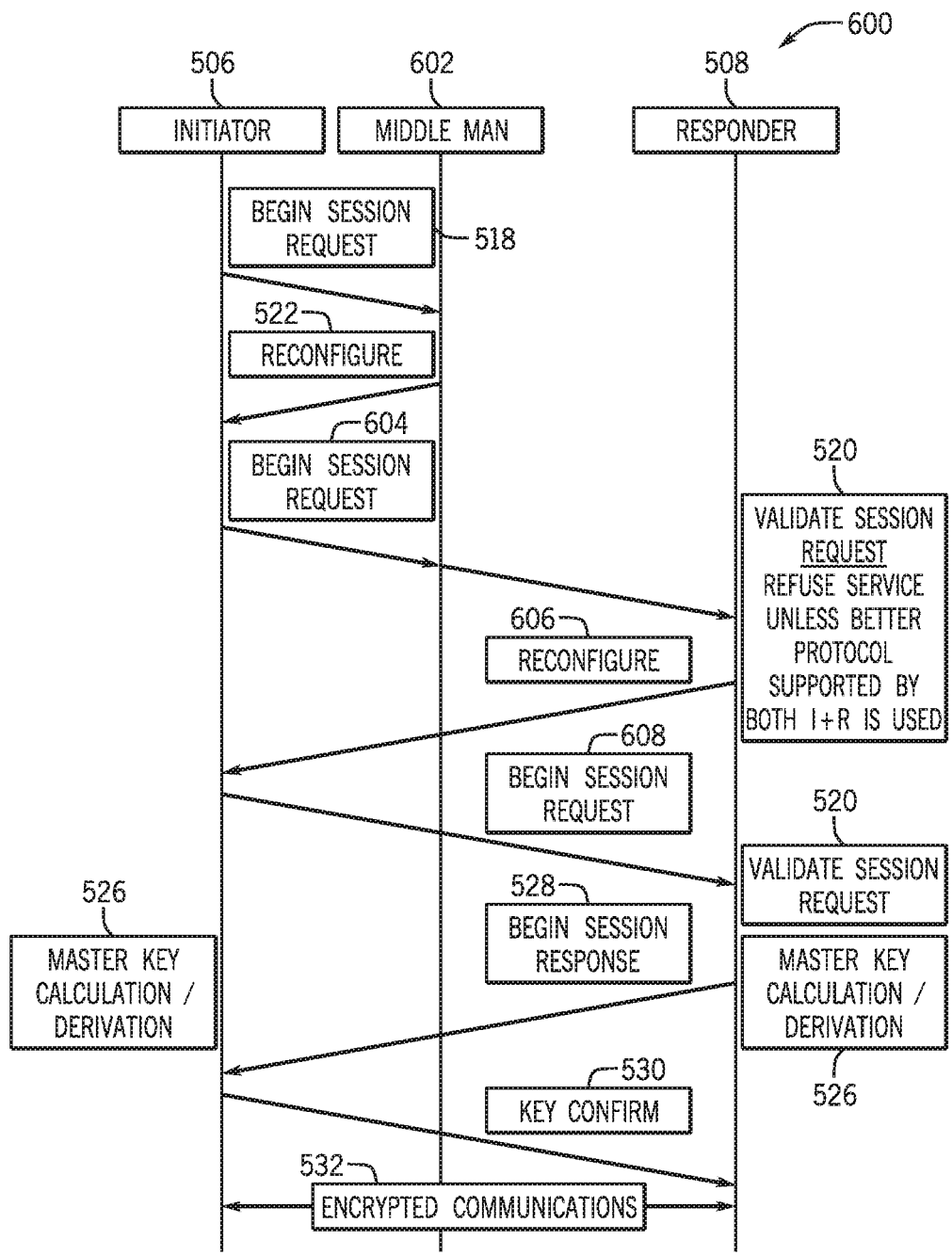
FIG. 6 is an example of a thwarted down-grade attack using the CASE protocol, in accordance with an embodiment.

As may be appreciated, the embodiments of the CASE protocol discussed so far may provide secure communications. By utilizing a symmetric key for the decryption of encrypted communications, processing power may be reduced over other methods of decryption. Further, by enabling the responder 508 to prioritize the variations/options of the CASE protocol to be agreed upon by the initiator 506 and the responder 508, the current embodiments reduce the possibility of downgrade attacks on the system 500. To further illustrate this point, FIG. 6 provides an example 600 of a thwarted down-grade attack using the CASE protocol embodiments described herein.

In the illustrated example 600, a "man in the middle" 602 intercepts the communications between the initiator 506 and the responder 508 and attempts to force a downgrade of protocol security. For example, the downgrade may be use of a more simplistic (less secure) protocol and/or a more simplistic elliptic curve for use in the cryptography of the session communication. By downgrading the security, the "man in the middle" 602 may more easily maliciously intercept, interpret, and/or manipulate communications between the initiator 506 and the responder 508.

For example, the initiator 506 may provide a begin session request 518 that proposes the use of the strongest protocol and/or strongest elliptic curve that it has available. The "man in the middle" 602 may intercept the begin session request 518 and provide its own reconfigure request 522, dictating that the initiator 506 use its weakest protocol and/or weakest elliptic curve. Based upon this reconfigure request 522, the initiator 506 may provide a new begin session request 604 that proposes use of the weakest protocol and/or elliptic curve, in accordance with the reconfigure request 522. Further, because the begin session request 604 is in line with the desires of the "man in the middle" 602, the request is forwarded to the responder 508.

Upon receipt of the begin session request 604, the responder 508 may begin the validate session request process 520. As will be discussed in more detail below, each of the begin session requests may contain a list of all available protocols and/or elliptic curves that may be used by the initiator 506. Accordingly, the validate session request 520 may refuse establishment of a session unless the preferred protocol and/or elliptic curve in common with both the initiator 506 and responder 508 are used.

Accordingly, in the current example, because the "man in the middle" caused a downgrade in the protocol and/or elliptic curve proposal by the initiator 506, the validate session request process 520 may result in a reconfigure request 606 be provided by the responder 508 to the initiator 506. The reconfigure request 606 may dictate that a session will be established using the preferred (e.g., stronger) protocol and/or elliptic curve.

As may be appreciated, the public key should be on the elliptic curve provided by the initiator 506. Accordingly, if a new elliptic curve is necessary, the initiator 506 may generate a new public key corresponding to the dictated elliptic curve provided by the responder 508.

The initiator 506 may provide an additional begin session request 608 that proposes the protocol and/or elliptic curve dictated in the reconfigure request 606. The validation of the session request process 520 is re-performed. Subject to validation of the begin session request 608, the master key calculation and/or derivation process 526 may be performed. Additionally, the begin session response 528 is provided to the initiator, such that the initiator 506 may performed the master key calculation and/or derivation process 526. From there, the key confirmation 530 may be optionally provided, as discussed above.

As illustrated, the current CASE protocol embodiments may reduce the number of downgrade attacks on systems that use it. Thus, these embodiments provide preferred security for encrypted communications 532 that may result in processing efficiencies and/or increased security.

Figure 7:
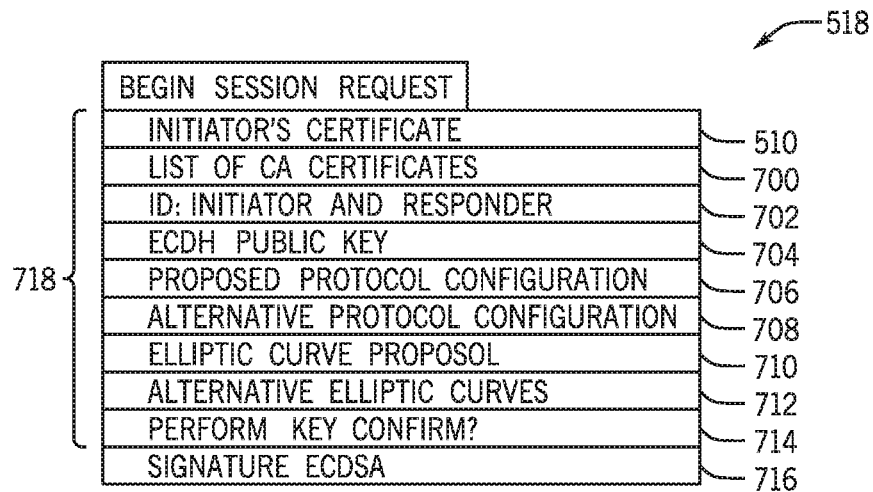
FIG. 7 is a schematic diagram of a session request message of the CASE protocol, in accordance with an embodiment.

Having now discussed the basic handshake between the initiator 506 and the responder 508, the discussion turns to the data provided in the begin session request 518. FIG. 7 is a schematic diagram of a session request message 518 of the CASE protocol, in accordance with an embodiment.

As previously mentioned, the begin session request message 518 includes an indication that the initiator 506 is trustworthy. This is done by providing the initiator certificate 510 in the begin session request. If the certificate 510 was provided by a certificate authority trusted by the responder 508, the responder can be assured that the holder of the certificate is trustworthy. In some instances a chain of certificate authority certificates 700 may be provided. For example, in FIG. 5, an intermediate certificate authority 504 provided the certificate 510 to the initiator 506. If the responder 508 does not explicitly trust the intermediate certificate authority 504, but does trust the root certificate authority 502, the responder may need to search the chain of certificate authority certificates 700 for a certificate issued to the intermediate certificate authority 504 by the root certificate authority 502. Any number of certificate authority certificates may be stored in the chain of certificate authority certificates 700. For example, in instances where the certificate 510 is trusted by the responder 508, no chain is needed to find a trusted certificate authority. Accordingly, the chain 700 may be empty.

The begin session request may also include an identity 702 of the initiator 506 and the responder 508. As will be discussed in more detail below, the responder 508 may use the responder 508 identity to determine whether the begin session request 518 was intended for the responder 508. Further, messages may be directed from the responder 508 to the initiator 506 using the initiator 506 identity.

The begin session request 518 may also include a public key 704. In some embodiments, the public key 704 may be an Elliptic Curve Diffie-Hellman public key. The public key 704 of the initiator 506 may be used in conjunction with a private key of the responder 508 to derive a master key, as will be discussed in more detail with regard to process 526 of FIG. 11.

As mentioned above, certain variations/options of the CASE protocol may be proposed for use between the initiator 506 and the responder 508. For example, the begin session request may include a proposed protocol configuration 706 that may indicate a particular protocol version the initiator 506 proposes to use. Additionally, the initiator may include a list of alternative protocol configurations 708 that are available for use by the initiator 506. In addition to protocol configuration options, the begin session request 518 may include an elliptic curve proposal 710 and an alternative elliptic list that provides all available elliptic curves for the initiator 506.

As will be discussed in more detail with regard to FIG. 9, the responder may use the proposals 706 and 710 along with the lists of alternatives 708 and 712 to discern whether the best common variations/options of the CASE protocol between the initiator 506 and the responder 508 are being proposed. If the best variations/options of the CASE protocol are not being proposed, the responder 508 may provide a reconfigure request 522, refusing the establishment of a session until the best common variations/options of the CASE protocol are used.

The begin session request may also include a perform key confirmation indicator 714, such as Boolean data. The perform key confirmation indicator 714 may provide an indication of whether or not the initiator requests key confirmation between the initiator 506 and the responder 508. Key confirmation is a validation that both the initiator 506 and the responder 508 have derived the same master key and/or master key derivations for use in the encrypted communications.

Additionally, to ensure that the begin session request message 518 is not tampered with, the data 718 may be signed by a signature 716. In some embodiments, an Elliptic Curve Digital Signature Algorithm may be used to generate the signature 716. Upon receipt of the request 518 by the responder 508, the responder 508 may verify the data 718 is in its original condition using the signature 716.

Figure 8:
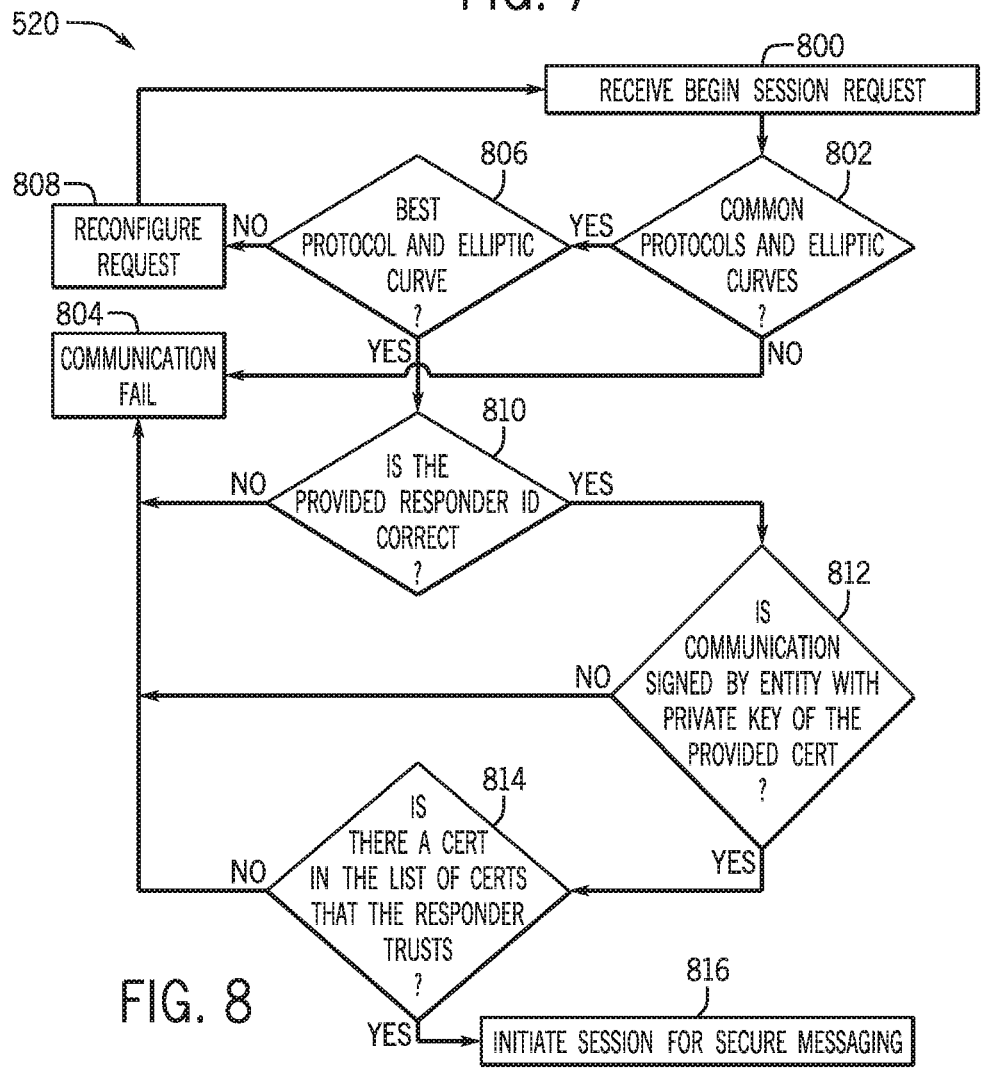
FIG. 8 is a flowchart illustrating a process for establishing a certificate authenticated session, in accordance with an embodiment.

Having now discussed the particular pieces of data provided in the begin session request 518, the discussion now turns to a more detailed look at how this data is used to establish a secure communications session. As mentioned above, once the request 518 is received by the responder 508, the responder 508 may validate the session request using the process 520. FIG. 8 is a flowchart illustrating a process 520 for validating a session request to establish a certificate authenticated session, in accordance with an embodiment.

First, a begin session request 518 is received by the responder 508 (block 800). As will be discussed in more detail with regard to FIG. 9, using the proposals 706 and 710 and the alternatives 708 and 712, the responder 508 determines whether there are common protocols and/or elliptic curves that both the initiator 506 and the responder 508 can use (decision block 802). If there are no common protocols and/or elliptic curves, a communications failure message is provided, because there are no common protocols and/or encryption methods that both the initiator 506 and the responder 508 can use (block 804).

The responder 508 also determines whether the most desirable protocol and/or elliptic curve is being proposed by the initiator 506 (decision block 806). If the best protocol and/or elliptic curve is not being proposed by the initiator 506, a reconfigure request is provided by the responder 508 to the initiator 506 dictating use of the best protocol and/or elliptic curve (block 808).

If, however, the best protocol and/or elliptic curve are proposed by the initiator 506, the responder 508 determines whether the responder identity (e.g., identity 702) matches the identity of the responder 508 (decision block 810). If it does not match the identity of the responder 508, a communication failure message is provided to the initiator 506 because the request was not intended for the responder 508.

If the responder identity is correct, the responder 508 determines whether the message 518 is signed by an entity with a private key of the provided certificate (decision block 812). For example, as mentioned above, the signature 716 may be used to verify unaltered data 718 of the request message 518. Accordingly, if the signature 716 verifies that the data 718 is unaltered, the responder 508 can be assured that the initiator's certificate 510 that is associated with the private key is unaltered, thereby authenticating the entity. If the communication is not signed by an entity with a private key of the provided certificate 510, a communication failure message is provided to the initiator 506 because the message 518 cannot be authenticated (block 804).

However, if the communication is signed by an entity with a private key of the provided certificate, the responder 508 determines whether the initiator's certificate 510 can be trusted. As mentioned above, the responder 508 may search the chain of certificate authority certificates 700 for a certificate issued by a certificate authority that the responder 508 trusts. If no such certificate exists, a communication failure message is provided to the initiator 506 because the initiator's certificate cannot be trusted (block 804).

If, however, a certificate issued from a trusted certificate authority is found in the chain of certificate authority certificates 700, the initiator's certificate 510 may be trusted by the responder 508. Thus, a session for secure communication may be established (e.g., by sending a begin session response 528) (block 816).

Figure 9:
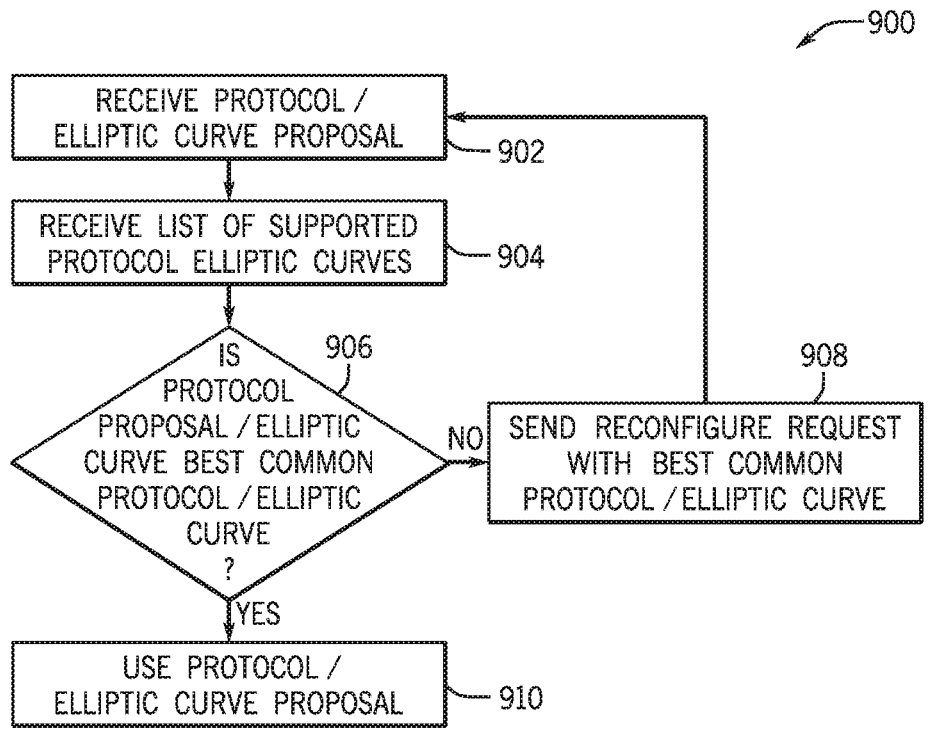
FIG. 9 is a flowchart illustrating a process for establishing a preferred encryption protocol and/or encryption curve, in accordance with an embodiment.

Turning now to more detailed discussion of the selection and enforcement of the best common protocol and/or elliptic curve between the initiator 506 and the responder 508, FIG. 9 is a flowchart illustrating a process 900 for establishing a preferred encryption protocol and/or encryption curve, in accordance with an embodiment. As mentioned above, the responder 508 receives proposals (block 902) and possible alternatives (block 904) from the initiator 506. For example, the initiator 506 provides the protocol configuration proposal 706 along with the alternative protocol configurations 708 available for use by the initiator 506 and the elliptic curve proposal 710 and list of alternative elliptic curves 712 available for use by the initiator 506 to the responder 508.

The responder 508 determines whether the proposed protocol and/or elliptic curve is the best common proposed protocol and/or elliptic curve between the initiator 506 and responder 508 (decision block 906). The best protocol and/or elliptic curve may change depending on a desired tradeoff of one or more characteristics of the communication. For example, in situations where processing power should be minimized, the best protocol configuration and/or elliptic curve may be a more simplistic configuration and/or curve that may provide less security but requires less processing power. In situations where data integrity and privacy is a primary concern, the best protocol configuration and/or elliptic curve may be a more complex protocol configuration and/or elliptic curve that provides increased security but may require increased processing power. In some embodiments, a hybrid approach of using a more complex protocol configuration and a simpler elliptic curve or a more complex elliptic curve and a simpler protocol configuration may be used to provide a balance between processing efficiency and security.

If the best protocol configuration and/or elliptic curve is not proposed, the responder may send a reconfigure request dictating that the best common protocol and/or elliptic curve be used (block 908). The responder then waits to receive a new proposal (block 902). However, if the best protocol configuration and/or elliptic curve is proposed, the responder confirms the use of the proposed protocol configuration and/or elliptic curve (block 910). For example, the responder 508 may do this by providing a subsequent begin session response 528.

Figure 10:
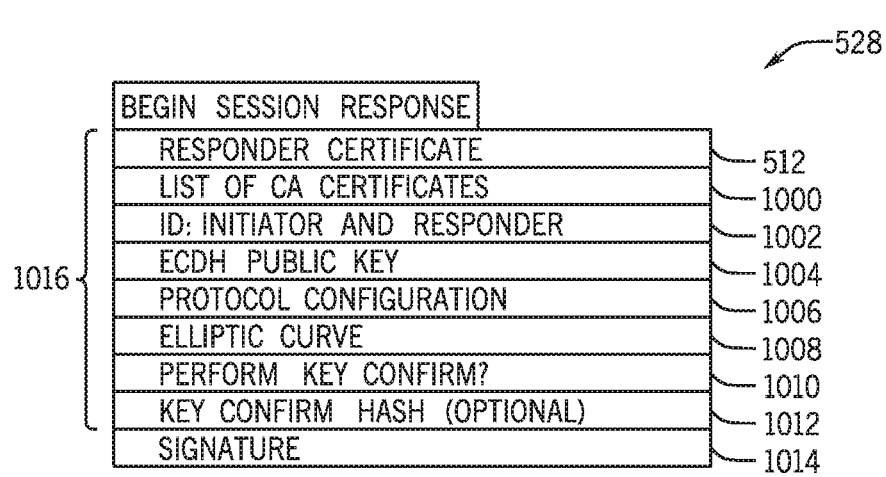
FIG. 10 is a schematic diagram of a session response message of the CASE protocol, in accordance with an embodiment.

Having discussed the processes resulting in provision of the begin session response, FIG. 10 is a schematic diagram of the data provided in the begin session response message 528, in accordance with an embodiment. The begin session response message 528 includes an indication that the responder 508 is trustworthy. This is done by providing the responder certificate 512 in the begin session response. If the certificate 512 was provided by a certificate authority trusted by the initiator 506, the initiator can be assured that the holder of the certificate is trustworthy. In some instances a chain of certificate authority certificates 1000 may be provided. Thus, if the initiator 506 does not explicitly trust an intermediate certificate authority providing the responder certificate 512, but does trust a certificate authority in the chain of certificate authority certificates 100, the initiator may trust the certificate 512. Any number of certificate authority certificates may be stored in the chain of certificate authority certificates 1000.

The begin session response may also include an identity 1002 of the initiator 506 and the responder 508. The initiator 506 may use the initiator 506 identity to determine whether the begin session response 528 was intended for the initiator 506. Further, messages may be directed from the initiator 506 to the responder 508 using the initiator 506 identity.

The begin session response 528 may also include a public key 1004. In some embodiments, the public key 1004 may be an Elliptic Curve Diffie-Hellman public key. The public key 1004 of the responder 508 may be used in conjunction with a private key of the initiator 506 to derive a master key, as will be discussed in more detail with regard to process 526 of FIG. 11.

As mentioned above, certain variations/options of the CASE protocol may be proposed for use between the initiator 506 and the responder 508. An agreement regarding the protocol configuration proposal and/or elliptic curve is confirmed when the begin session response 528 is provided by the responder 528. The begin session response 528 includes a specification of the agreed upon protocol configuration 1008 and the elliptic curve 1008. Accordingly, the begin session response 528 may act a conformation of the proposals provided in the begin session request 518.

Similar to the begin session request 518 provided by the initiator 506, the begin session response 528 may also include a perform key confirmation indicator 1010 (e.g., a Boolean data) indicating that the responder 508 requests key confirmation. As previously discussed, key confirmation is a validation that both the initiator 506 and the responder 508 have derived the same master key and/or master key derivations for use in the encrypted communications.

When either the initiator 506 or the responder 508 indicates that key confirmation is desired (e.g., by indicating "1" or "true" for the Boolean perform key confirmation indicator 714 and/or 1010, respectively), a key confirmation hash 1012 (e.g., a double hash of a master key derivation) may be provided by the responder 508 via the begin session response 528. The initiator 506, upon receiving the key confirmation hash 1012, may validate that the key confirmation hash 1012 is derived from the master key (e.g., by recreating the double hash of the master key derivation and comparing with the key confirmation hash 1012). Further, as discussed above, the initiator 506 may provide a key confirmation message 530 (e.g., a single hash of the master key derivation) that provides proof that the initiator 506 has derived the proper master key.

By first providing a double hash of the master key derivation, the system may ensure that both the initiator 506 and the responder 508 have derived the proper master key. If a single hash were initially sent from the responder 508, the initiator 506 could confirm that the responder has derived the proper master key, but the responder 508 could not be sure that the initiator 506 had derived the proper master key. For instance, the initiator 506 could send the single hash of the master key derivation, but such data could be sourced from either a computation or merely mirroring back the single hash provided by the responder 508. By providing the double hash, the initiator 506 may recreate the double hash to verify the accuracy of the responder 506 confirmation data 1012. Further, the initiator 506 may provide a single hash of the master key derivation in order to provide that tie initiator 506 has derived the proper master key, because a single hash is not easily obtainable from the double hash data provided by the responder 508.

Additionally, to ensure that the begin session response message 528 is not tampered with, the data 1016 may be signed by a signature 1014. In some embodiments, an Elliptic Curve Digital Signature Algorithm may be used to generate the signature 1014. Upon receipt of the response 528 by the initiator 506, the initiator 506 may verify the data 1016 is in its original condition using the signature 1014.

Figure 11:
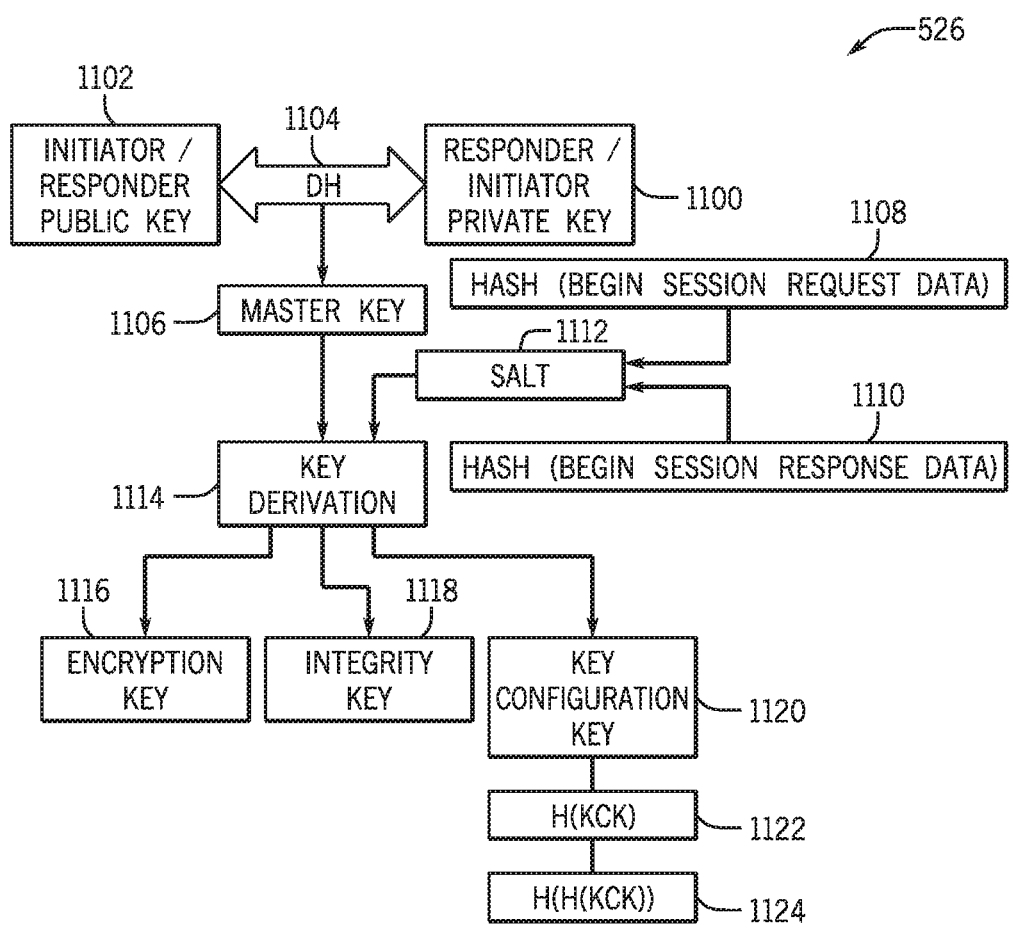
FIG. 11 is a flowchart illustrating a process for obtaining a master key and master key derivations, in accordance with an embodiment.

Having now discussed the various pieces of data provided in the begin session response 528, the discussion now turns to calculation of the master key and master key derivations. FIG. 11 is a flowchart illustrating a process 526 for obtaining a master key and master key derivations, in accordance with an embodiment. As mentioned above, one private key combined with one public key may be used to derive a master key useful for secured communications. Accordingly, the process 526 begins by collecting a local private key (block 1100) and a public key from the entity communication is being established with) (block 1102). Thus, the initiator 506 will use the initiator 506 private key in combination with the responder 508 public key (e.g., provided in the begin session response message 528) to derive the master key. The responder 508 will use the responder 508 private key in combination with the initiator 506 public key (e.g., provided in the begin session request 518) to derive the master key.

The master key may be derived using a Diffie-Hellman calculation using the public key obtained at block 1100 and the private key obtained at block 1102, as illustrated by the processing arrow 1104. The Diffie-Hellman calculation results in a master key (block 1106). A hash function of the begin session request data (block 1108) and/or a hash function of the begin session response data (block 1110) are applied to the master key 1106 via salt 1112. The salt 1112 acts to further strength the master key 1106, by providing an additional random input to subsequent master key derivations (block 1114). By using the hash functions 1108 and/or 1110, the salt 1112 may include both an element of randomness (e.g., from the public key data), further strengthening the master key derivations. Further, the hash functions 1108 and/or 1110 provide an element of authentication (e.g., from the signature data) to the salt 1112, thus increasing the integrity of the salt 1112 and/or the key derivation. The master key derivation process 1114 uses the master key 1106 with the salt 1112 to define an encryption key 1116, an integrity key 1118 and a key confirmation key 1120.

The encryption key 1116 is used in encryption/decryption of the messages sent between the initiator 506 and the responder 508, the integrity key 1118 is used by the functions that verify the integrity of the data, and the key confirmation key 1120 is used in the key confirmation functions described above (e.g., the single hash 1122 and double hash 1124 values are derived from the key confirmation key 1120. By using the key derivation keys (e.g., the encryption key 1116, the integrity key 1118, and the key confirmation key 1120) for particular functions of the system implementing the CASE protocol, the master key 1106 may be further protected from unauthorized exposure, thus increasing data security.

In some embodiments, a Password Authenticated Session Establishment (PASE) protocol may be used to establish a common session key between the initiator 506 and responder 508, without requiring a public/private key infrastructure. In such embodiments, the common session key (e.g., the master key or derivative of the master key) may be established using a shared password. Such embodiments may use a variant of the Password Authenticated Key Exchange by Juggling (J-PAKE) protocol to enable both the initiator 506 and the responder 508 to establish private and authenticated communications based solely on their shared (relatively low-entropy) password without requiring a public key infrastructure.

The PASE protocol involves the exchange of three or four messages in one and a half or two round trips. The number of messages exchanged depends on whether the initiator 506 of the exchange requests explicit confirmation of success.

Figure 12:
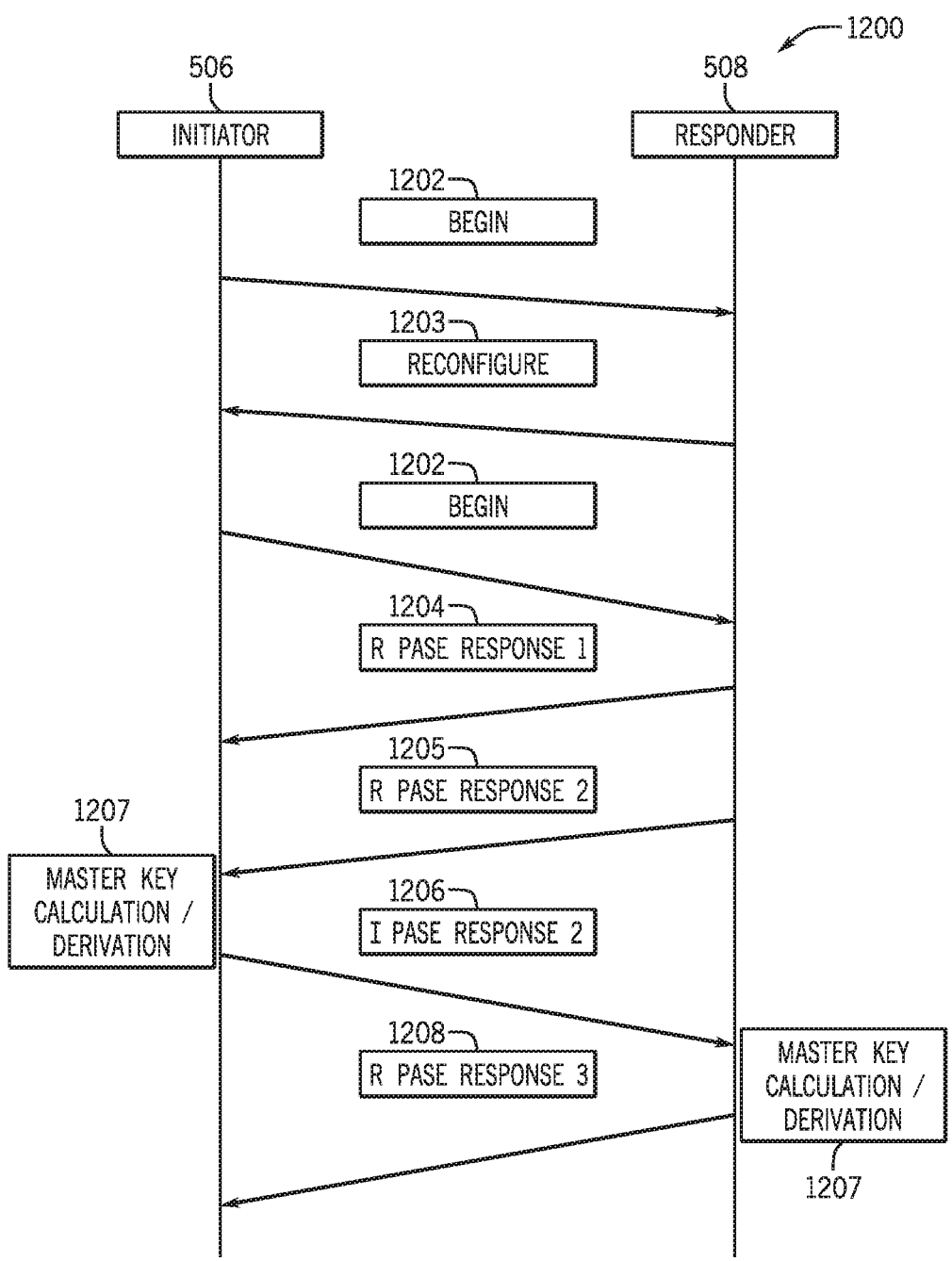
FIG. 12 is an illustration of a system that establishes a session using a password authenticated session establishment (PASE) protocol, in accordance with an embodiment.

FIG. 12 is an illustration of a system 1200 that establishes a session using a password authenticated session establishment (PASE) protocol, in accordance with an embodiment. As with the CASE protocol, the initiator 506 requests the establishment of a new secure communications session between the initiator 506 (or other devices upstream of the initiator 506) and the responder 508 (or other devices downstream of the responder 508) by providing a message (e.g., the Begin Message 1202) to the responder 508. The data provided in this Begin Message 1202 will be discussed in more detail with regard to FIG. 13.

In response to the Begin Message 1202, the responder 508 may either provide a reconfigure message 1203 (e.g., similar to the reconfigure message 522 of FIG. 5) or a first Responder PASE response 1204 and/or a second Responder PASE Response 1205, which will be discussed in more detail with regard to FIG. 14. The reconfigure message 1203 is provided by the responder 508 when the responder 508 wishes to use a more desirable configuration than that proposed in the Begin message 1202. In response, the initiator 506 may provide another Begin message 1202 with the configuration dictated by the Reconfigure message 1203.

Figure 14:
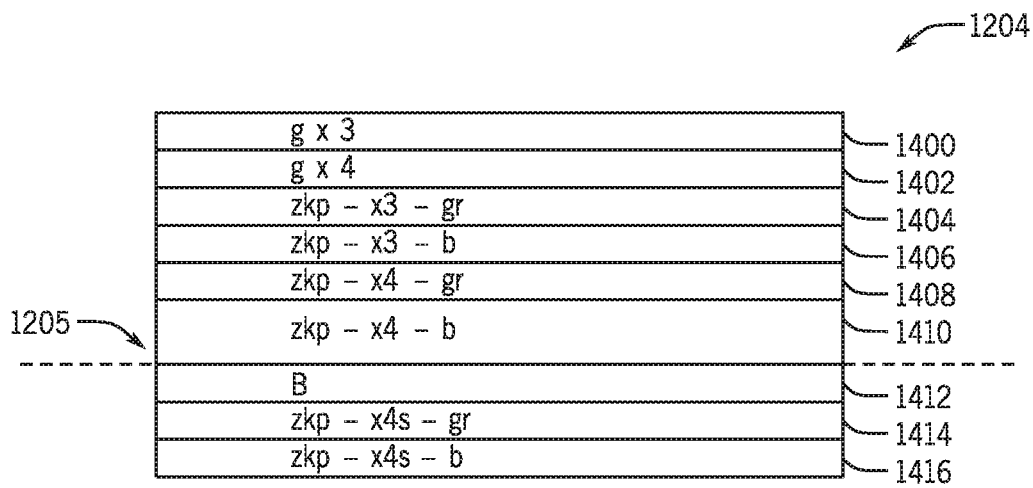
FIG. 14 is a schematic diagram of a first and/or second response message of the PASE protocol, in accordance with an embodiment.

Upon receiving a Begin message 1202 with the proper configuration settings, the responder sends a first Responder PASE Response 1204 and/or a second Responder PASE Response 1205 (e.g., the message described in FIG. 14). The initiator 506 provides a second PASE response 1206 in response to receiving the first PASE response 1204 and/or the second Responder PASE message 1205 from the responder 508. The data provided in message 1206 will be discussed in more detail with regard to FIG. 15. Additionally, upon receiving the messages 1204 and/or 1205, the initiator may calculate a master key and/or master key derivations (function 1207). Function 1207 may be similar to process 526 of FIG. 11, except that instead of using Diffie-Hellman calculations on keys 1102 and 1100, a J-PAKE cryptographic protocol is implemented using the data in the messages 1204 and 1205 (e.g., when calculating the key for the initiator 506). Further, the salt 1112 may be altered to be a combination of the zero-knowledge proof of the message 1205 and/or message 1204 and the message 1206.

Lastly, in response to receiving the second PASE response message 1206 from the initiator 506, the responder 508 provides a third PASE response 1208 to the initiator 506. The details of the data provided in the message 1208 will be described in more detail with regard to FIG. 16. Further, the responder 508 now has enough information to calculate the master key and/or derivations (function 1207). Function 1207 may be similar to process 526 of FIG. 11, except that instead of using Diffie-Hellman calculations on keys 1102 and 1100, a J-PAKE cryptographic protocol is implemented using the data in the messages 1202 and 1206 (e.g., when calculating the key for the responder 508).

Figure 13:
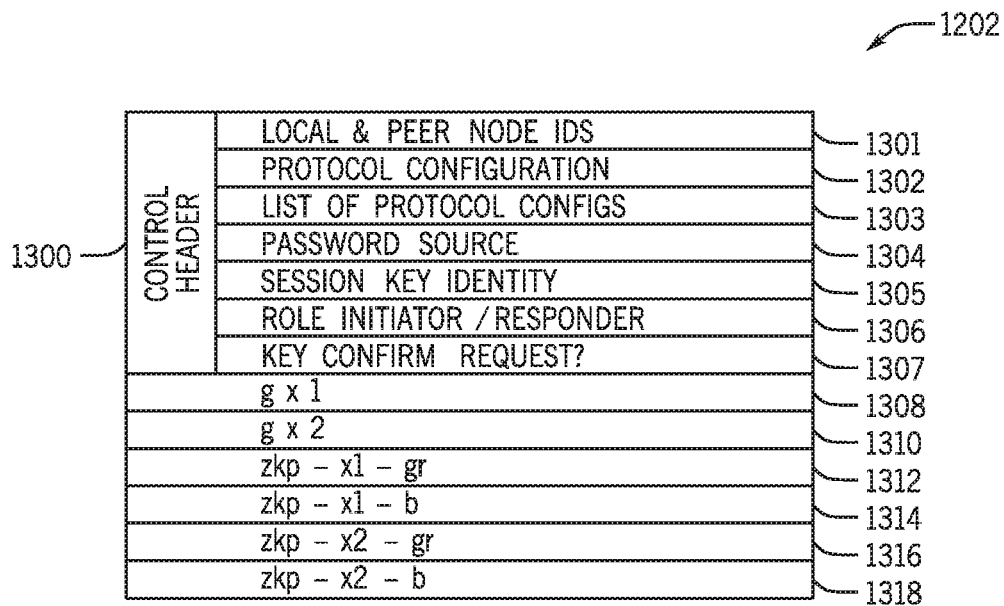
FIG. 13 is a schematic diagram of a session request message of the PASE protocol, in accordance with an embodiment.

FIG. 13 is a schematic diagram of a session request message 1202 of the PASE protocol, in accordance with an embodiment. As illustrated in FIG. 13, the message 1202 contains a control header 1300 (e.g. 32 bits) that may be an unsigned integer bit field. The control header 1300 may contain identifiers for local and peer nodes 1301, a protocol configuration sub-field 1302 (e.g., 4 bits) that may be an unsigned integer that identifies the protocol configuration to be used, and a list of available protocol configurations 1303 (similar to list 706, discussed with regard to FIG. 7). Further, the control header 1300 may include a password source sub-field 1304 (e.g. 4 bits) that may be an unsigned integer identifying the source of the password used to form the request. A password source 1304 may be provided that indicates where a secret "s" that is passed in the messages 1202, 1204, 1205, and/or 1206 may be sourced. Example sources might include a Wi-Fi network password, a pairing code obtained from product packaging, etc.

A session key identifier sub-field 1306 (e.g. 16 bytes) may also be included in the control header 1300. The session key identifier sub-field 1306 may be an unsigned integer specifying the session key id that will be used to identify the session once it is established.

The message 1202 may also include J-PAKE data, such as a gx1 field 1308, a gx2 field 1310, a zkp-x1-gr field 1312, a zkp-x1-b field 1314, a zkp-x2-gr field 1316, and/or a zkp-x2-b field 1318. The gx1 field 1308 stores the J-PAKE $g_{x1}$ value represented as a variable length integer in big-endian format. The gx2 field 1310 stores the J-PAKE $g^{x2}$ value represented as a variable length integer in big-endian format. The zkp-x1-gr field 1312 stores the gr value associated with the zero-knowledge proof of x1, represented as a variable length integer in big-endian format. The zkp-x1-b field 1314 stores the b value associated with the zero-knowledge proof of x1, represented as a variable length integer in big-endian format. The zkp-x2-gr field 1316 holds the $g^r$ value associated with the zero-knowledge proof of x2, represented as a variable length integer in big-endian format. The zkp-x2-b field 1318 holds the b value associated with the zero-knowledge proof of x2, represented as a variable length integer in big-endian format.

As mentioned above, in response to receiving the message 1202, the responder 508 provides a first and/or second Responder PASE response message 1204. FIG. 14 is a schematic diagram of a first and/or second Responder PASE response message 1204, in accordance with an embodiment.

The message 1204 contains a multitude of fields useful for a J-PAKE-based key establishment. For example, the message 1204 may include a gx3 field 1400, a gx4 field 1402, a zkp-x3-gr field 1404, a zkp-x3-b field 1406, a zkp-x4-gr field 1408, a zkp-x4-b field 1410, a B field 1412, a zkp-x4s-gr field 1414, and a zkp-x4s-b field 1416. In some embodiments, each of these fields are provided in a single Responder PASE response message (e.g., the first Responder PASE response message 1204). Alternatively, to reduce the amount of data in a single message, the fields may be optionally transferred in two messages (e.g., the first and second Responder PASE response messages 1204 and 1205). The dashed line indicates where such a split into two messages, each field above the line (e.g., fields 1400, 1402, 1404, 1406, 1408, and 1410) provided in the first Responder PASE response message 1204 and each field below the line (e.g., fields 1412, 1414, and 1416) provided in the second Responder PASE Response message 1205).

The gx3 field 1400 holds the J-PAKE $g^{x3}$ value represented as a variable length integer in big-endian format. The gx4 field 1402 holds the J-PAKE $g^{x4}$ value represented as a variable length integer in big-endian format. The zkp-x3-gr field 1404 holds the $g^r$ value associated with the zero-knowledge proof of x3, represented as a variable length integer in big-endian format. The zkp-x3-b field 1406 holds the b value associated with the zero-knowledge proof of x3, represented as a variable length integer in big-endian format. The zkp-x4-gr field 1408 holds the $g^r$ value associated with the zero-knowledge proof of x4, represented as a variable length integer in big-endian format. The zkp-x4-b field 1410 holds the b value associated with the zero-knowledge proof of x4, represented as a variable length integer in big-endian format. The B field 1412 holds the J-PAKE B value (equal to $g^{(x1+x2+x3)*x4*s}$, represented as a variable length integer in big-endian format. As used herein, "s" is the secret (e.g., password), sourced from the password source 1304. The zkp-x4s-gr field 1414 holds the $g^r$ value associated with the zero-knowledge proof of x4*s, represented as a variable length integer in big-endian format. The zkp-x4s-b field 1416 holds the b value associated with the zero-knowledge proof of x4*s, represented as a variable length integer in big-endian format.

Figure 15:
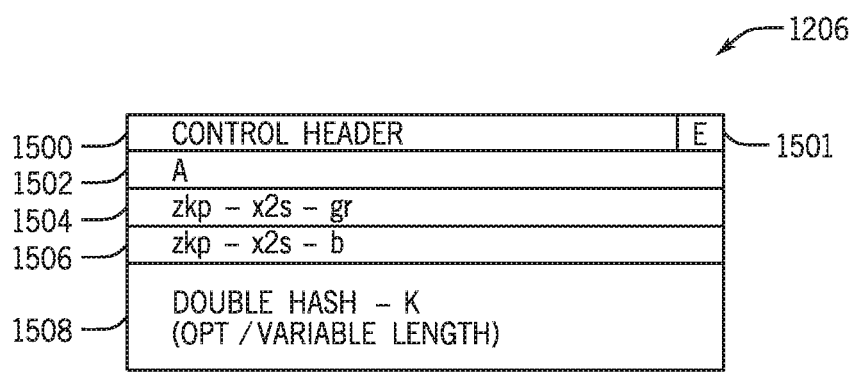
FIG. 15 is a schematic diagram of a second response message of the PASE protocol, in accordance with an embodiment.

In response to receiving the first response message 1204, the initiator 506 provides the responder 508 with a second response message 1206. FIG. 15 is a schematic diagram of a second response message 1206 of the PASE protocol, in accordance with an embodiment.

The second response message includes a control header 1500 that includes an explicit confirmation field 1501, an A field 1502, a zkp-x2s-gr field 1504, a zkp-x2s-b field 1506, and, optionally, a double hash-k field 1508.

The Control Header 1500 (e.g., 8 bits) is an unsigned integer bit field containing the E (Explicit Confirmation) Flag (e.g., 1 bit) sub-field 1501. The E sub-field 1501 is a single bit flag that, when set to 1, indicates that initiator 506 wants to perform an explicit confirmation of the derived session key (e.g., similar to the key confirmation functionality discussed above).

The A field 1502 holds the J-PAKE A value (equal to $g^{(x1+x3+x4)*x2*s}$, represented as a variable length integer in big-endian format. The zkp-x2s-gr field 1504 holds the gr value associated with the zero-knowledge proof of x2*s, represented as a variable length integer in big-endian format. The zkp-x2s-b field 1506 holds the b value associated with the zero-knowledge proof of x2*s, represented as a variable length integer in big-endian format.

The double-hash-k field 1508 is optional and may be of variable length. This field 1508 holds the double hash of the derived session key (i.e. H(H(k))), represented as a variable length integer in big-endian format. The double-hash-k field is only present when the E (Explicit Confirmation) flag is 1.

Figure 16:
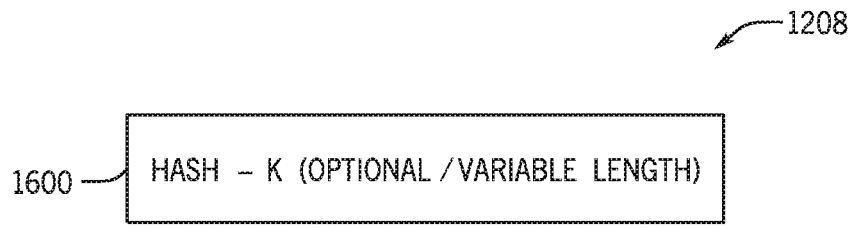
FIG. 16 a schematic diagram of a third response message of the PASE protocol, in accordance with an embodiment.

In response to receiving the message 1206, the responder 508 may send a third response message 1208. FIG. 16 a schematic diagram of a third response message of the PASE protocol, in accordance with an embodiment. The responder 508 may send the third response message 1208 if requested by the initiator 506. For example, this may occur when the initiator 506 sets the E (Explicit Confirmation) flag field 1501 in the second response 1206.

The third response message 1208 includes a hash-k field 1600 that is optional and may be a variable length. For example, as mentioned above, in some embodiments, this message 1208 may only be sent when the E flag field 1501 is set in the second response 1206. The hash-k field 1600 holds the hash of the derived session key (i.e. H(k)), represented as a variable length integer in big-endian format. By providing this message to the initiator 506, the initiator 506 may confirm that the responder 508 has derived the same session key as the initiator 506.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for establishing a secure communications session between an initiator electronic device and a responder electronic device, comprising:
    providing to the responder electronic device, from the initiator electronic device, a request to begin a secure communication session, the request comprising:
       initiator password-authenticated key agreement protocol data for security key establishment via password authentication at the responder electronic device;
       a list of available parameters of the initiator electronic device;
       a password source in a password source sub-field; and
       one or more proposed parameters from the list of available parameters; and
    establishing a initiator electronic device side of the secure communications session only when the one or more proposed parameters match one or more prioritized parameters.

2. The method of claim 1, comprising: establishing the initiator electronic device side of the secure communications session, by:
    receiving, at the initiator electronic device, at least one begin session response, the begin session response comprising responder password-authenticated key agreement protocol data for security key establishment via password authentication at the initiator electronic device.

3. The method of claim 2, comprising:
    deriving, via the initiator electronic device, a master key for decrypting encrypted messages using the responder password-authenticated key agreement protocol data.

4. The method of claim 2, wherein the prioritized parameters are determined by the responder electronic device based upon the one or more proposed parameters.

5. The method of claim 2, wherein at least a portion of a responder password-authenticated key agreement protocol data is derived from the password.

6. The method of claim 1, wherein:
    the responder password-authenticated key agreement protocol data comprises Password Authenticated Key Exchange by Juggling (J-PAKE) information; and
    the responder password-authenticated key agreement protocol data comprises:
       a gx3 field, configured to hold a J-PAKE $g^{x3}$ value;
       a gx4 field, configured to hold a J-PAKE $g^{x4}$ value;
       a zkp-x3-gr field, configured to hold a J-PAKE $g^r$ value associated with a zero-knowledge proof of x3;
       a zkp-x3-b field, configured to hold a J-PAKE b value associated with the zero-knowledge proof of x3;
       a zkp-x4-gr field, configured to hold a J-PAKE $g^r$ value associated with a zero-knowledge proof of x4;
       a zkp-x4-b field, configured to hold a J-PAKE value associated with the zero-knowledge proof of x4;
       a B field, configured to hold a J-PAKE B value equal to $g^{(x1+x2+x3)*x4*s)}$;
       a zkp-x4s-gr field, configured to hold a J-PAKE $g^r$ value associated with the zero-knowledge proof of x4*s, where s is a secret defined by the password;
       a zkp-x4s-b field, configured to hold a J-PAKE b value associated with the zero-knowledge proof of x4*s;
       or any combination thereof.

7. The method of claim 6, comprising:
    receiving, in a first begin session response, the gx3 field, the gx4 field, the zkp-x3-gr field, the zkp-x3-b field, the zkp-x4-gr field, and the zkp-x4-b field; and
    receiving in a second begin session response, the B field, the zkp-x4s-gr field, and the zkp-x4s-b field.

8. The method of claim 1, wherein the password source comprises: a Wi-Fi network password, a pairing code obtained from product packaging, or both.

9. The method of claim 1, wherein the initiator password-authenticated key agreement protocol data comprises Password Authenticated Key Exchange by Juggling (J-PAKE) information.

10. The method of claim 1, wherein the request comprises a control header, the control header comprising identifiers for local and peer nodes.

11. The method of claim 1, wherein the request comprises:
    a gx1 field, configured to store a J-PAKE $g^{x1}$ value of the initiator password-authenticated key agreement protocol data;
    a gx2 field, configured to store a J-PAKE $g^{x2}$ value of the initiator password-authenticated key agreement protocol data;
    a zkp-x1-gr field, configured to store a J-PAKE $g^r$ value of the initiator password-authenticated key agreement protocol data;
    a zkp-x1-b field, configured to store a J-PAKE b value of the initiator password-authenticated key agreement protocol data;
    a zkp-x2-gr field, configured to store a J-PAKE $g^r$ value of the initiator password-authenticated key agreement protocol data;

a zkp-x2-b field, configured to store a J-PAKE b value of the initiator password-authenticated key agreement protocol data; or any combination thereof.

12. A tangible, non-transitory machine-readable medium comprising instructions to:
generate a request to begin a secure communication session, the request comprising:
initiator password-authenticated key agreement protocol data for security key establishment via password authentication at a responder electronic device;
a list of available parameters of an initiator electronic device;
a password source in a password source sub-field; and
one or more proposed parameters from the list of available parameters; and
provide the request to a responder electronic device;
wherein a secure communications session is established only when the one or more proposed parameters match one or more prioritized parameters.

13. The machine-readable medium of claim 12, comprising instructions to:
in response to the begin session request, receive at least one begin session response, the at least one begin session response comprising responder password-authenticated key agreement protocol data for security key establishment via password authentication at the initiator electronic device.

14. The machine-readable medium of claim 13, comprising instructions to:
derive a master key, one or more master key derivations, or any combination thereof, based at least in part upon the responder password-authenticated key agreement protocol data.

15. The machine-readable medium of claim 13, wherein the initiator password-authenticated key agreement protocol data, the responder password-authenticated key agreement protocol data, or both comprises Password Authenticated Key Exchange by Juggling (J-PAKE) information.

16. The machine-readable medium of claim 15, comprising:
in response to the at least one begin session response, generating and providing at least one initiator response corresponding to the at least one begin session response, the at least one initiator response comprising:
a control header;
an explicit confirmation field, configured to store an indication of whether or not an initiator electronic device wants to perform an explicitly confirmation of a derived session key;
an A field, configured to store a J-PAKE A value that is equal to $g^{(x1+x3+x4)*x2*s}$;
a zkp-x2s-gr field, configured to store a J-PAKE $g^r$ value associated with a zero-knowledge proof of x2*s, where s is a secret password;
a zkp-x2s-b field, configured to store a J-PAKE b value associated with the zero-knowledge proof of x2*s;
a double hash-k field, configured to store a double hash of the derived session key; or
a combination thereof.

17. An electronic device comprising:
a processor configured to:
generate a request to begin a secure communication session, the request comprising:
initiator password-authenticated key agreement protocol data for security key establishment via password authentication at the responder electronic device;
a list of available parameters of an initiator electronic device;
a password source in a password source sub-field; and
one or more proposed parameters from the list of available parameters; and
provide the request to a responder electronic device; and
provide the request to a responder electronic device to request establishment of a secure communications session with a responder electronic device;
wherein a secure communications session is established only when the one or more proposed parameters match one or more prioritized parameters.

18. The electronic device of claim 17, wherein the initiator password-authenticated key agreement protocol data comprises Password Authenticated Key Exchange by Juggling (J-PAKE) information and the processor is configured to:
in response to the begin session request, receive at least one begin session response, the at least one begin session response comprising J-PAKE responder password-authenticated key agreement protocol data for security key establishment via password authentication at the initiator electronic device; and
derive a master key, master key derivations, or both, based at least in part upon the J-PAKE responder password-authenticated key agreement protocol data.

19. The electronic device of claim 18, wherein the processor is configured to:
in response to the at least one begin session response, generating and providing at least one initiator response corresponding to the at least one begin session response, the at least one initiator response comprising J-PAKE data that enables the responder electronic device to derive the master key, the master key derivations, or both, based at least in part upon the J-PAKE data.

20. The electronic device of claim 17, wherein the password source comprises: a Wi-Fi network password, a pairing code obtained from product packaging, or both.

* * * * *